United States Patent [19]
Kerns et al.

[11] Patent Number: 5,384,707
[45] Date of Patent: Jan. 24, 1995

[54] DIAGNOSTIC AIRFLOW MEASUREMENT

[75] Inventors: James M. Kerns, Grosse Ile; Michael J. Cullen, Dearborn; Michael S. Sweppy, Ypsilanti, all of Mich.

[73] Assignee: Ford Motor Company, Dearborn, Mich.

[21] Appl. No.: 83,205

[22] Filed: Jun. 29, 1993

Related U.S. Application Data

[63] Continuation of Ser. No. 623,471, Dec. 7, 1990, abandoned.

[51] Int. Cl.⁶ .................. F02D 41/18; F02D 41/22
[52] U.S. Cl. ..................... 364/431.11; 123/479; 123/494
[58] Field of Search .......... 364/431.11, 431.05, 364/431.06, 431.07; 123/478, 479, 480, 494

[56] References Cited

U.S. PATENT DOCUMENTS

| | | | |
|---|---|---|---|
| 4,483,299 | 11/1984 | Otobe et al. | 123/479 |
| 4,587,615 | 5/1986 | Takahashi | 364/431.11 |
| 4,599,696 | 7/1986 | Takahashi | 364/431.11 |
| 4,704,685 | 11/1987 | Martinsons et al. | 364/431.11 |
| 4,768,013 | 8/1988 | Aramaki | 123/479 |
| 4,817,418 | 4/1989 | Asami et al. | 73/118.1 |
| 5,007,399 | 4/1991 | Nakaniwa | 123/489 |

*Primary Examiner*—Vincent N. Trans
*Attorney, Agent, or Firm*—Peter Abolins; Clifford L. Sadler

[57] ABSTRACT

A diagnostic method for an internal combustion engine determines airflow using three independent airflow determinations. The three airflow determinations are compared to each other and an error is established if one airflow determination differs significantly from at least one other airflow determination.

14 Claims, 2 Drawing Sheets

DIAGNOSTIC AIRFLOW MEASUREMENT

This application is a continuation of application Ser. No 07/623,471, filed Dec. 7, 1990 now abandoned.

BACKGROUND OF THE INVENTION

1. Field of the Invention

This invention relates to detecting an abnormality in determining the quantity of intake air being supplied to an internal combustion engine.

2. Prior Art

U.S. Pat. No. 4,483,229, discloses a method for detecting an abnormal output value of a sensor and for substituting a previously stored "error free" value in place of the detected erroneous value. There is no teaching of calculated redundant airflow values which are compared with one another to determine the possible and correct measurement. In particular, the patent teaches determining the presence of specific failures where the sensor outputs a constant value equal to a specific not expected value for some length of time. For example, for a manifold pressure sensor, this type of failure will result from the sensor being physically disconnected, the vacuum connection to the intake manifold is obstructed or there is a rather gross failure of the sensor itself.

Other diagnostic systems with various inputs are also known. A first input to the diagnostic system can be from the air meter. This meter measures the mass of air flowing into the engine's intake manifold. An alternate system is a calculation based upon engine speed (rpm), intake manifold pressure (MAP), and some other factors. Airflow is also inferred from measured throttle position (TP), rpm and density corrections (barometric pressure (BP), and inlet air temperature (ACT). These measurements of airflow are currently used. It is also known to perform rationality checks based on relations between air mass and TP to detect failures. These checks do not, however, indicate which of the two measurements are at fault. These are some of the problems this invention has overcome.

SUMMARY OF THE INVENTION

This invention includes a diagnostic method for an internal combustion engine including determining airflow using three independent airflow determinations, comparing the three airflow determinations to each other, and establishing an error has been detected if one airflow determination differs significantly from at least one other airflow determination. By using information from each of three systems, three independent values can be calculated for measure of the airflow through the engine. If one of these three values differs significantly from the others, it is an indication of a problem with that particular system.

Existing tests in vehicles look at some of the parameters for diagnostics, but the fuel information is not used to calculate or measure airflow. As a result, these other systems do not have three independent measures that can be used to focus on the problem system.

DETAILED DESCRIPTION OF THE INVENTION

Figure 1:
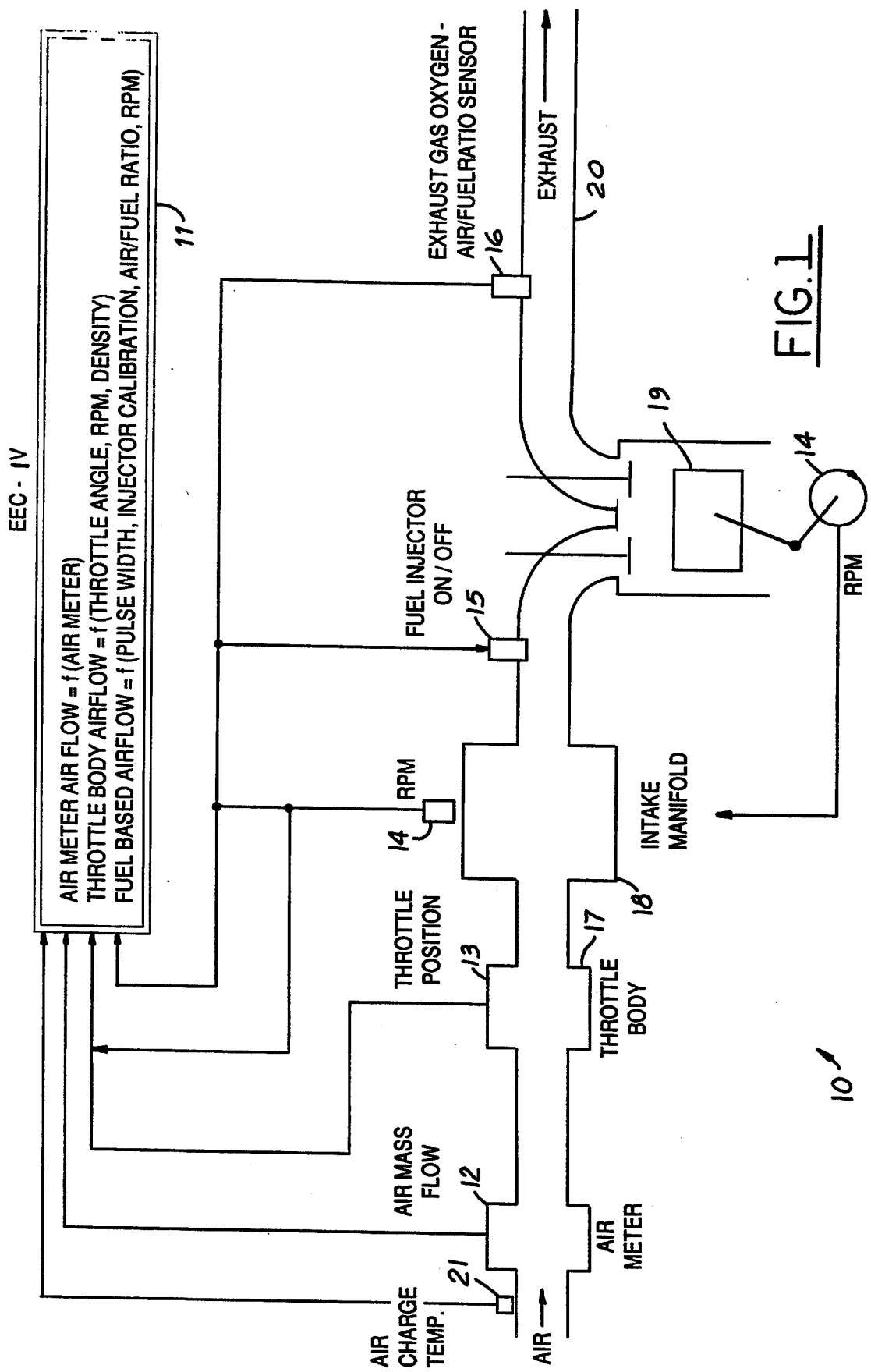
FIG. 1 is a block diagram of an engine control system in accordance with an embodiment of this invention.

Referring to FIG. 1, a diagnostic airflow measurement system 10 includes an electronic engine control (EEC-IV) 11, a throttle position sensor 13, an air charge temperature sensor 21, an rpm sensor 14, a fuel injector 15, and an exhaust gas oxygen sensor 16. Airflow into an engine passes through air meter 12, a throttle body 17, intake manifold 18, and into a cylinder 19. After combustion, exhaust from cylinder 19 exists through an exhaust pipe 20.

Electronic engine control module 11 receives airflow parameters to determine airflow as a function of the air meter reading. Throttle position is received to determine throttle body airflow as a function of throttle angle, engine rpm, and air density. Signals indicating exhaust gas oxygen, injector firing, and engine rpm are used to determine the fuel-based airflow based upon the pulse width of the signal applied to the fuel injector, the injector calibration, the air/fuel ratio, and the engine rpm.

During most operation, fuel flow is controlled using air/fuel ratio information from an exhaust gas oxygen sensor (EGO) and from an airflow indication. Given air/fuel ratio information and assumed fuel flow based on the injector pulse widths, a measure of airflow can be calculated. Thus, three measures of airflow (from air meter, TP/rpm and EGO/injectors) can be compared, and if one of the three differs significantly from the other two, an error has been detected. Also, by knowing which of the three measures is in error, the number of possible causes is greatly reduced.

"LOAD" is a unitless parameter used by electronic engine control 11 as a measure of airflow calculated from air meter or throttle body data. The value of LOAD is calculated by dividing the mass of air inducted into a cylinder by the mass of air that would be in the cylinder at standard pressure and temperature. This provides a measure of airflow that has been normalized for engine displacement per cylinder and can be used when comparing calibration data from dissimilar engines. For naturally aspirated engines, LOAD will vary from less than 0.2 at idle to almost 1.0 at wide-open throttle. Turbocharged and supercharged engines will exceed a value of 1.0 during boost.

The calculation of LOAD from air meter data is performed as follows:

$$LOAD = AirCharge/StandardAirCharge$$

Where AirCharge is the air mass inducted per intake stroke and StandardAirCharge is a constant equal to the mass of air in a cylinder at a standard temperature and pressure.

LOAD can be calculated from a look-up table as a function of throttle position and rpm plus corrections for air density.

LOAD was chosen as the measure of airflow to be used in the diagnostic routine because it was already calculated for the air meter and throttle body in the existing EEC software. Also, there are alternatives for replacing mass air meter 12. For example, a vane meter may be used. If the vane meter is used it needs to be corrected for air density. Alternatively, a speed density calculation may be used instead of mass air meter 12. In a speed density calculation, airflow is determined as a function of manifold absolute pressure, air charge temperature and an assumed volumetric efficiency. Because of the need to use manifold absolute pressure, a manifold absolute pressure sensor is needed. Since this is an additional cost it may well be desirable to use other methods in determining airflow.

Figure 2:
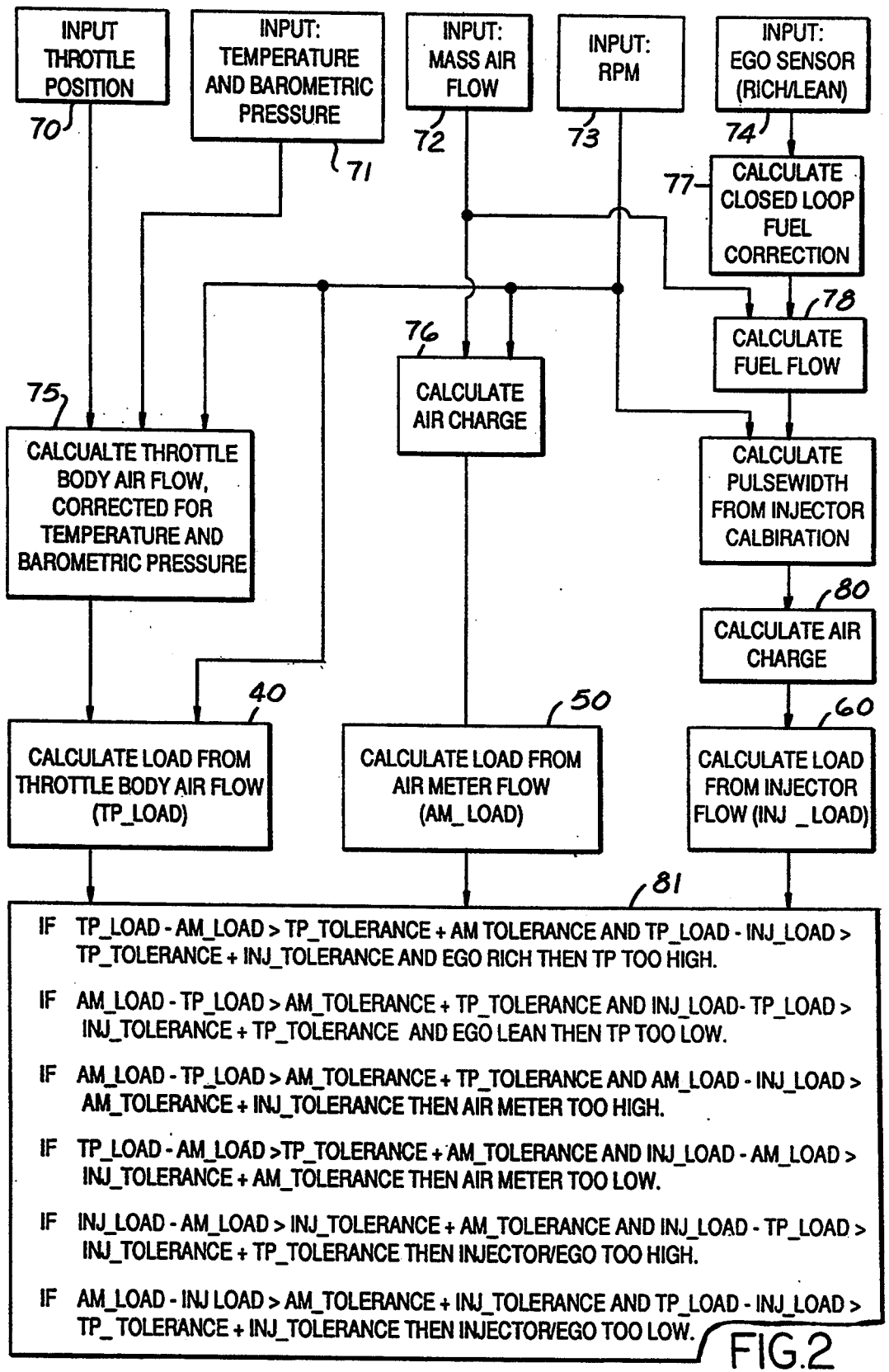
FIG. 2 is a flow diagram of alternate ways of calculating load in accordance with an embodiment of this invention.

Referring to FIG. 2, calculating load is done three different ways at blocks 40, 50 and 60. More specifically, an input 70 provides throttle position, an input 71 provides temperature and barometric pressure, an input 72 provides mass airflow, an input 73 provides engine RPM and an input 74 provides an exhaust gas oxygen sensor with a rich or lean indication. Barometric pressure can either be measured using a pressure sensor or inferred using a calculation based upon inputs from sensors measuring such engine operating parameters as engine speed, exhaust gas recirculation, and intake manifold pressure. A description of inferring barometric pressure is presented in copending patent application U.S. Ser. No. 07/582,704, entitled "Method and Apparatus for Inferring Barometric Pressure Surrounding an Internal Combustion Engine", filed Sep. 12, 1990.

Inputs 70, 71 and 73 are coupled to a block 75 to calculate the throttle body airflow, corrected for temperature and barometric pressure. Inputs 72 and 73 are connected to a block 76 to calculate AirCharge. AirCharge is defined as the airflow rate divided by the engine speed. Input 74 is connected to a block 77 to calculate a closed loop fuel correction. Input 72 and the output of block 77 are connected to a block 78 to calculate fuel flow. Input 73 and the output of block 78 are connected to a block 79 to calculate the pulse width from the injector calibration. The output of block 79 is coupled to a block 80 to calculate AirCharge. AirCharge from the fuel method is equal to the fuel charge multiplied by the air/fuel ratio. The output of block 80 is applied to block 60 to calculate the load from the injector flow. The output of block 76 is coupled to a block 50 to calculate load from the air meter flow. The output of block 75 and input 73 are coupled to block 40 to calculate the load from the throttle body airflow.

Blocks 40, 50 and 60 are coupled to block 81 wherein logic for comparing the loads is determined. The logic uses tolerances wherein each element of determining airflow, such as throttle position, injector fuel flow and air meter airflow indication is given a tolerance, tp tolerance, inj-tolerance, am-tolerance, respectively. An error is indicated if the loads are calculated from any two of the elements determining airflow differ by more than the sum of their tolerances.

More specifically, there are six logical comparisons to make a determination if an error is detected. First, if throttle position load less air meter airflow load is greater than the throttle position tolerance plus the air meter tolerance and if the throttle position load less the injector load is greater than the throttle position tolerance plus the injector tolerance then the throttle position is too high. Also, the exhaust gas oxygen sensor signal must be rich to insure that the system has had a chance to correct for air meter errors.

Second, if the air meter load less the throttle position load is greater than the air meter tolerance plus the throttle position tolerance and the injector load less the throttle position load is greater than the injector tolerance plus the throttle position tolerance then the throttle position is too low and the exhaust gas oxygen is lean. Also, the exhaust gas oxygen sensor signal must be lean to insure that the system has had a chance to correct for air meter errors.

Third, if the air meter load less the throttle position load is greater than the air meter tolerance plus the throttle position tolerance and the air meter load less the injector load is greater than the air meter tolerance plus the injector tolerance then the air meter is too high.

Fourth, if the throttle position load less the air meter load is greater than the throttle position tolerance plus the air meter tolerance and the injector load less the air meter load is greater than the injector tolerance plus the air meter tolerance then the air meter is too low.

Fifth, if the injector load less the air meter load is greater than the injector tolerance plus the air meter tolerance and the injector load less the throttle position load is greater than the injector tolerance plus the throttle position tolerance then the injector/exhaust gas oxygen is too high.

Sixth, if the air meter load less the injector load is greater than the air meter tolerance plus the injector tolerance and the throttle position load less the injector load is greater than the throttle position tolerance plus injector tolerance then the injector/exhaust gas oxygen is too low.

Various modifications and variations will no doubt occur to those skilled in the art. For example, engine load may be determined in other ways than that disclosed herein. These and all other such variations come within the scope of the attached claims which define the invention.

What is claimed is:

1. A diagnostic method for an internal combustion engine, including the steps of:

determining airflow using three independent airflow determinations at substantially the same time, each of the three independent airflow determinations being made at a different point in the airflow path into the engine and each of the three independent airflow determinations using a different determination technique.

comparing the three airflow determinations to each other; and establishing an error has been detected if one airflow determination differs significantly from at least one other airflow determination.

2. A diagnostic method as recited in claim 1, wherein the step of determining airflow includes:

calculating airflow as a function of an output signal from an exhaust gas oxygen sensor indicating air/fuel ratio and a fuel injector pulse width signal indicating fuel flow information;

measuring airflow using an airflow meter; and calculating airflow using engine throttle position and engine rpm.

3. A diagnostic method for an internal combustion engine as recited in claim 1, including the steps of:

calculating airflow as a function of an output signal from an exhaust gas oxygen sensor indicating air/fuel ratio and a fuel injector pulse width signal indicating fuel flow information;

determining airflow using another independent airflow determination; and establishing an error has been detected if one airflow determination differs significantly from the other airflow determination.

4. A diagnostic method for an internal combustion engine as recited in claim 1, including determining airflow using the steps of:
   calculating airflow as a function of an output signal from an exhaust gas oxygen sensor indicating air/fuel ratio and a fuel injector pulse width signal indicating fuel flow information;
   measuring airflow using an airflow meter; and
   calculating airflow using engine throttle position and engine RPM.

5. A diagnostic method of an internal combustion engine, including determining airflow using three independent airflow determinations at substantially the same time, each of the three independent airflow determinations being made at a different point in the airflow path into the engine and each of the three independent airflow determinations using a different determination technique, including the steps of comparing the three airflows to see if one differs significantly from at least one other airflow determination, thus establishing an error has been detected, using the following steps:
   determining that a throttle position indication is too high if the difference between a throttle position based engine load indication and an air meter based engine load indication is greater than the sum of a throttle position tolerance parameter and an air meter tolerance parameter;
   determining that a throttle position indication is too low if the air meter load minus throttle position load is greater than the sum of the air meter tolerance parameter plus the throttle position tolerance parameter;
   determining an air meter indication is too high if the air meter load minus the throttle position load is greater than the air meter tolerance parameter plus the throttle position tolerance parameter and the air meter load minus an injector flow based engine load indication is greater than air meter tolerance parameter plus injector tolerance parameter;
   determining an air meter indication is too low if the throttle position load minus the air meter load is greater than throttle position tolerance parameter plus the air meter tolerance parameter and the injector load minus the air meter load is greater than an injector tolerance parameter plus the air meter tolerance parameter;
   determining the injector flow based load indication is too high if the injector load minus the air meter load is greater than the sum of the injector tolerance parameter plus the air meter on the injector load minus the throttle position load is greater than the sum of the injector tolerance plus the throttle position tolerance; and
   determining the injector flow based load indication is too low if the air meter load minus the injector load is greater than the air meter tolerance plus the injector tolerance and the throttle position load minus the injector load is greater than the throttle position tolerance plus the injector tolerance.

6. A diagnostic method as recited in claim 5, further comprising the step of calculating engine load based upon the throttle body airflow by using inputs indicating engine RPM and a calculated throttle body airflow corrected for temperature and barometric pressure, which in turn is calculated using inputs indicating throttle position, temperature, barometric pressure and engine RPM.

7. A diagnostic method as recited in claim 6, further comprising the step of calculating engine load based upon the air meter flow by using inputs indicating mass airflow.

8. A diagnostic method as recited in claim 7, further comprising the step of calculating engine load based upon the injector flow by using inputs from a closed loop fuel calculation using an exhaust gas oxygen sensor output, and from a mass airflow input so as to calculate fuel flow, fuel pulse width, and an engine air charge.

9. An internal combustion engine and a coupled electronic engine control diagnostic apparatus including:
   a combustion cylinder of an engine;
   an electronic engine control module operatively coupled to the combustion chamber;
   an airflow path for inducting air into said combustion chamber;
   an air meter in said airflow path providing an output signal indicating airflow coupled to said electronic engine control modules;
   a throttle body in said airflow path having an output signal indicating throttle position coupled to said electronic engine control module;
   a fuel injector coupled to said combustion cylinder responsive to a fuel injection signal coupled to said electronic engine control module for determining fuel pulse width;
   an exhaust gas oxygen sensor coupled to an exhaust path from said cylinder providing a signal indicative of exhaust gas oxygen concentration coupled to said electronic engine control module; and
   said electronic engine control module including processing means for calculating airflow as a function of the output signal from the exhaust gas oxygen sensor and the fuel injector pulse width signal, generating an airflow as a result of the measurement from the airflow meter, calculating airflow as a function of the engine throttle position and the engine RPM, comparing the three airflow determinations to each other, and establishing an error has been detected if one airflow determination differs significantly from at least one other airflow determination.

10. An electronic engine control diagnostic apparatus for an internal combustion engine, including:
   means for determining airflow using three independent airflow determination means at substantially the same time, each of the three independent airflow determinations being made at a different point in the airflow path into the engine and each of the three independent airflow determinations using a different determination technique;
   means for comparing the three airflow determinations to each other; and
   means for establishing an error has been detected if one airflow determination differs significantly from at least one other airflow determination, wherein the means for determining airflow includes:
   means for calculating airflow as a function of an output signal from an exhaust gas oxygen sensor indicating air/fuel ratio and a fuel injector pulse width signal indicating fuel flow information;
   means for measuring airflow using an airflow meter; and
   means for calculating airflow using engine throttle position and engine rpm.

11. An electronic engine control diagnostic apparatus for an internal combustion engine as recited in claim 10 wherein the means for determining airflow includes:
   means for calculating airflow as a function of an output signal from an exhaust gas oxygen sensor indicating air/fuel ratio and a fuel injector pulse width signal indicating fuel flow information;
   means for determining airflow using another independent airflow determination; and
   means for establishing an error has been detected if one airflow determination differs significantly from the other airflow determination.

12. An electronic engine control diagnostic apparatus for an internal combustion engine as recited in claim 10, including means for determining airflow using:
   means for calculating airflow as a function of an output signal from an exhaust gas oxygen sensor indicating air/fuel ratio and a fuel injector pulse width signal indicating fuel flow information;
   means for measuring airflow using an airflow meter; and
   means for calculating airflow using engine throttle position and engine RPM.

13. An electronic engine control diagnostic apparatus for an internal combustion engine, including means for determining airflow using three independent airflow determinations at substantially the same time, each of the three independent airflow determinations being made at a different point in the airflow path into the engine and each of the three independent airflow determinations using a different determination technique including means for comparing the three airflows to see if one differs significantly from at least one other airflow determination, thus establishing an error has been detected, using the following apparatus:
   means for determining that a throttle position is too high if the difference between a throttle position based engine load and an air meter based engine load indication is greater than the sum of a throttle position tolerance parameter and air meter tolerance parameter;
   means for determining that a throttle position is too low if the air meter load minus throttle position load is greater than the sum of the air meter tolerance parameter plus the throttle position tolerance parameter;
   means for determining an air meter is too high if the air meter load minus the throttle position load is greater than the air meter tolerance parameter plus the throttle position tolerance parameter and the air meter load minus an injector flow based engine load indication is greater than the air meter tolerance parameter plus an injector tolerance parameter;
   means for determining an air meter is too low if the throttle position load minus the air meter load is greater than throttle position tolerance parameter plus the air meter tolerance parameter and the injector load minus the air meter load is greater than the injector tolerance parameter plus the air meter tolerance parameter;
   means for determining the injector flow based load is too high if the injector load minus the air meter load is greater than the sum of the injector tolerance parameter plus the air meter on the injector load minus the throttle position load is greater than the sum of the injector tolerance plus the throttle position tolerance; and
   means for determining the injector flow based load is too low if the air meter load minus the injector load is greater than the air meter tolerance plus the injector tolerance and the throttle position load minus the injector load is greater than the throttle position tolerance plus the injector tolerance.

14. An electronic engine control diagnostic apparatus as recited in claim 13, further comprising means for calculating engine load based upon the throttle body airflow by using inputs coupled to receive information indicating engine RPM and a calculated throttle body airflow corrected for temperature and barometric pressure, and using inputs indirectly coupled to receive information indicating throttle position, temperature, barometric pressure and engine RPM;
   a means for load calculation from the air meter flow has inputs coupled to receive information from the mass airflow meter; and
   a means for calculating engine load based upon the injector flow by using inputs coupled to receive information from a closed loop fuel calculation using an exhaust gas oxygen sensor output, and from a mass airflow input so as to calculate fuel flow, fuel pulse width, and an engine air charge.

* * * * *